J. E. MacDONALD.
OVERSHOE FOR HORSES.
APPLICATION FILED MAR. 1, 1909.
947,343.
Patented Jan. 25, 1910.
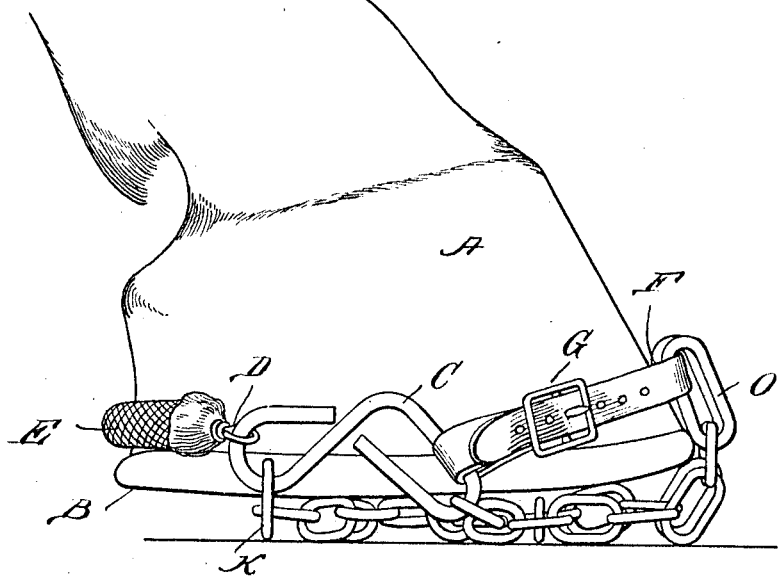
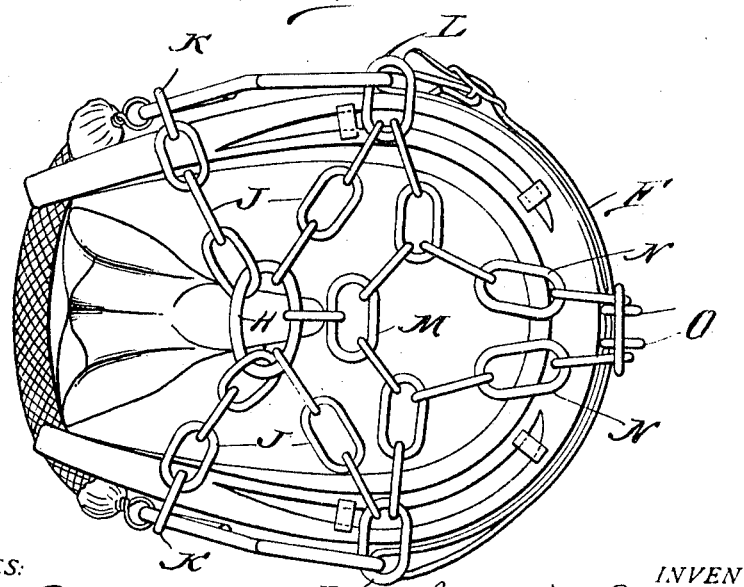
WITNESSES:
INVENTOR.
Jeremiah E. MacDonald,
BY
ATTORNEY.

UNITED STATES PATENT OFFICE.

JEREMIAH E. MacDONALD, OF DALTON, MASSACHUSETTS.

OVERSHOE FOR HORSES.

947,343.　　　　Specification of Letters Patent.　　Patented Jan. 25, 1910.

Application filed March 1, 1909.　Serial No. 480,613.

*To all whom it may concern:*

Be it known that I, JEREMIAH E. MacDONALD, a citizen of the United States of America, and resident of Dalton, in the county of Berkshire and State of Massachusetts, have invented certain new and useful Improvements in Overshoes for Horses, of which the following is a full, clear, and exact description.

My invention relates to improvements in overshoes for horses, the object being the provision of a device of this character which may be instantly applied to the hoof of the animal, and which will absolutely prevent slipping upon ice or sleet.

Another object of my invention is the provision of an overshoe which is capable of adjustment to the hoof of any horse and which will dispense with the use of calks or other means to prevent slipping, and which overshoe will in addition to preventing slipping greatly assist the animal, and which is capable of production at a small price and is strong and durable.

With these objects in view, my invention consists of an overshoe or hoof harness embodying novel features of construction and combination of parts substantially as disclosed herein.

In order that the details of construction and the manner of applying and using my overshoe may be fully understood and its advantages fully appreciated, I have illustrated in the accompanying drawings the overshoe for horses' hoofs constructed in accordance with and embodying my invention.

Figure 1, represents a side elevation of the horse's hoof with my overshoe applied thereto, and, Fig. 2, represents a bottom plan view of the hoof with my overshoe in position thereon.

In the drawings, the letter A, designates the hoof to which is attached the shoe B, and in connection with which I employ my overshoe or harness. The overshoe consists of the pair of double looped side pieces C, which have the loops thereof inclined in opposite directions to conform to the outline of the shoe and hoof, and to one loop is connected by means of eyes D the cord or chain E, which passes around the rear of the hoof, and to the other loop of each side piece is connected the double strap F, which passes over the toe portion of the hoof and is provided with the buckle G, for the purpose of securing the looped side pieces in proper position upon the hoof of the animal, and said strap is adjustable to accommodate the strap to hoofs of varying sizes as circumstances require.

Directly under the frog of the hoof is the single elongated link H from which lead the four chain members J, to which are connected respectively the vertical links K and the horizontal links L. To the front of the loop H is connected the open linked chain member M, composed of a series of links located under the toe portion of the hoof, and to the forward links N of the chain member M is connected at the toe portion the pair of vertically disposed and inclined links O, the said links O receiving the adjusting and securing strap F.

From the foregoing description taken in connection with the drawings it will be readily understood that my overshoe is slipped upon the hoof with the cord or chain resting in the depression at the heel portion of the hoof, with the adjusting and securing strap around the toe portion and with the chain members entirely covering the under portion of the hoof and forming a tread surface which absolutely and positively prevents slipping of the hoof upon the ice or sleet, and which also causes the chain members to secure an engagement or footing in the ice or sleet rendering the draft of the animal easy and comfortable. It will also be apparent that my overshoe is capable of instant application to the hoof of the animal and is adjustable to hoofs of any size or shape, and can be easily transported, being compact and of light weight, and that the overshoe is inexpensive of production, and thoroughly efficient and practical in every particular.

I claim:

1. In an overshoe, the combination with the tread, horizontally disposed double looped side members on each side having both loops connected to the tread, means connecting the rear loops of the side pieces, and a flexible connection passed through the front loops of the side pieces and an extension on the front of the tread, the ends of said connection being brought together and joined to hold the device in position.

2. In an overshoe for horses, the combination with the tread, a double looped side piece connected to each side thereof, means connecting the rear loops of the said side piece, and adjustable means connecting the front pair of loops and having engagement with the tread for adjusting and retaining the overshoe upon the hoof of the horse.

Signed by me at Springfield, Mass., in presence of two subscribing witnesses.

JEREMIAH E. MacDONALD.

Witnesses:
 LEONORA MACDONALD,
 G. R. DRISCOLL.